United States Patent [19]

Lindsey

[11] Patent Number: 4,872,291
[45] Date of Patent: Oct. 10, 1989

[54] MOUNTING DEVICE

[75] Inventor: Kevin Lindsey, Sunbury-on-Thames, England

[73] Assignee: National Research Development Corporation, London, United Kingdom

[21] Appl. No.: 289,433

[22] Filed: Dec. 22, 1988

Related U.S. Application Data

[63] Continuation of Ser. No. 84,851, Aug. 13, 1987, abandoned.

[30] Foreign Application Priority Data

Aug. 13, 1986 [GB] United Kingdom ............... 8619699

[51] Int. Cl.$^4$ ............................................. B24B 41/02
[52] U.S. Cl. .................................... 51/166 R; 51/122; 408/234; 409/235

[58] Field of Search ................ 51/109 R, 122, 166 R, 51/166 TS, 166 MT; 52/749; 408/234; 409/235; 82/DIG. 9

[56] References Cited

U.S. PATENT DOCUMENTS 2,919,899  1/1960  Hitchcock ..................... 51/166 R
3,883,994  5/1975  Dellinger ..................... 51/166 MH Primary Examiner—Roscoe V. Parker
Attorney, Agent, or Firm—Cushman, Darby & Cushman

[57] ABSTRACT

A very stiff mounting device, particularly for a machine tool or measuring instrument, is constructed from six rod-like members the ends of which are rigidly coupled together to form a tetrahedral structure and mounting means comprising a rigid member fixedly coupled to three of said rod-like members, said three rod-like members not being co-planar.

18 Claims, 2 Drawing Sheets

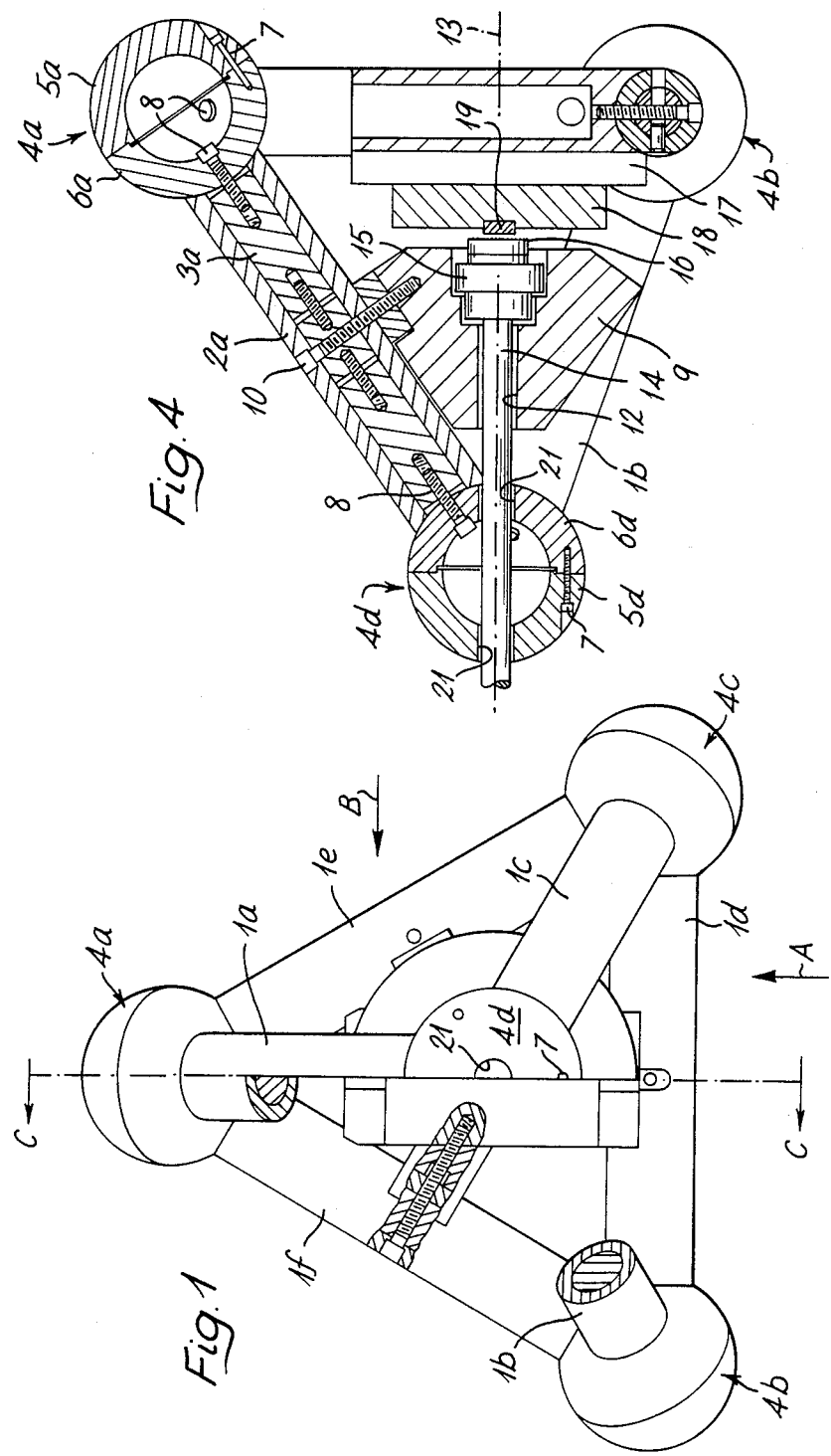

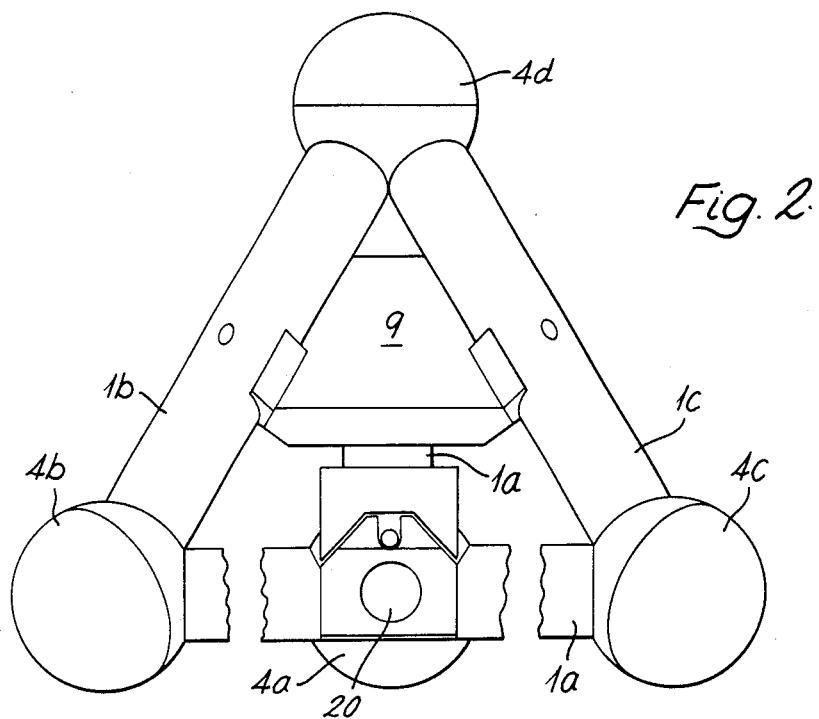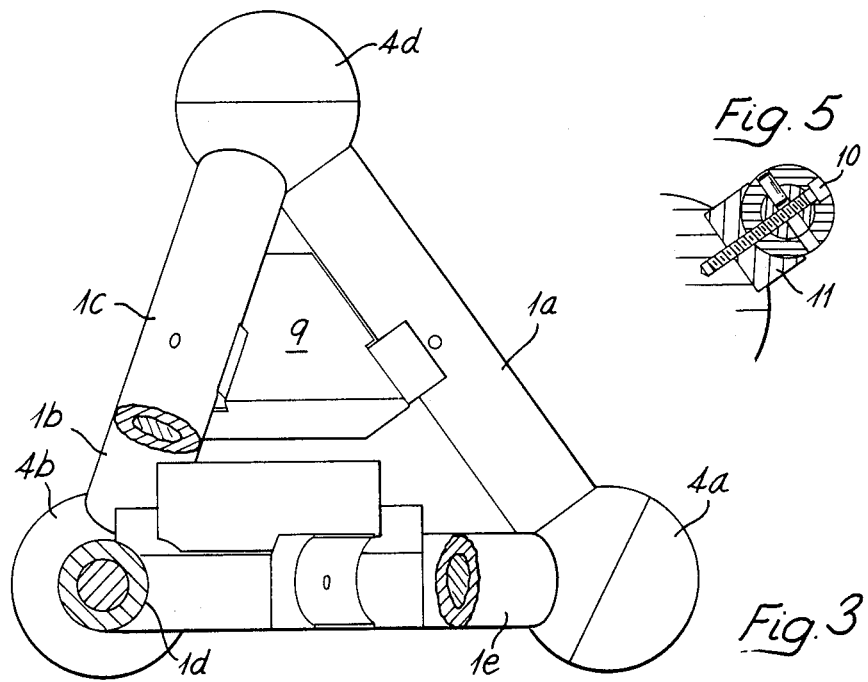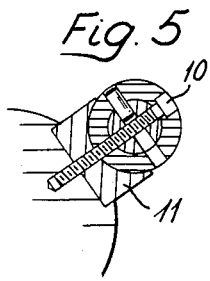

MOUNTING DEVICE

This is a continuation of application Ser. No. 084,851, filed Aug. 13, 1987, now abandoned.

This invention relates to mounting devices and in particular to mounting devices having high inherent rigidity and being suitable for high precision machine tool and metrological applications.

Conventional machine tools comprise three- or four-cantilever systems with, for example, a base or work head, and a post and tool bracket. Examples are a vertical axis grinder, a drill and a horizontal axis lathe. With such structures the cross-sectional area of the constituent components needs to be large to obtain acceptable rigidity.

We have found that improved rigidity and reduced sensitivity to thermal and other destabilising forces can be attained by adopting a tetrahedral mounting structure.

Accordingly the present invention provides a mounting device comprising six rod-like members the ends of which are rigidly coupled together to form a substantially tetrahedral structure and mounting means comprising a rigid member fixedly coupled to three of said rod-like members, said three rod-like members not being co-planar.

A structure formed from rod-like members, for example, bars, rods or tubes, will show no tendency to shape distortion or shearing by the application of a tensile or compressive stress to the apices if all of the apices are connected by straight members. (The only distortion is that produced by the relatively small elastic compression or extension of the straight member). Without these directly-joining members the apices will tend to suffer rotation (if "pin-jointed") and if rigidly connected will tend to bend the straight members. An optimal structure is a tetrahedron which, having only four joints, the minimum necessary for a three dimensional framework, has few distortion modes. Intrinsically, a tetrahedron has a straight member connecting each of its apices.

Since a tetrahedron can be pin-jointed, the members can be decoupled so that vibration is not transmitted. Vibrations are therefore confined to individual members. Susceptibility to vibration is decreased by maximising the fundamental frequencies of the components of the structure. This can be achieved by using low aspect ratio (ratio of length to diameter/width) components and, in the case of tubular members, by optimising wall thickness. The enclosed space in tubular members can be utilised to assist with vibration desensitisation in two ways. It may contain an adjustable tensioning rod-/screw system to tune the tubular member's fundamental frequency. It may also be used to contain rods which have fundamental frequencies different from that of the tubular member. Additionally the gap between the rods and the tubular members may be filled with a damping material.

The structural members can thus be tuned to produce minimum excitation of each other and the smallest interception of the wide spectrum of destabilising sources.

A regular (equilateral) tetrahedral structure may be constructed so that all members are dimensionally, physically and mechanically substantially identical with advantageous effects on the structure's physical and mechanical properties (stiffness, vibration response, thermal characteristics).

Although a regular tetrahedral structure is substantially symmetrical about four axes, for most applications it is sufficient to consider symmetry about an axis normal to a triangular face through the vertex not contained in that face. This axis will hereinafter be referred to as the machine principal axis and the surface normal thereto as the base.

The inherent axial symmetry of a tetrahedral structure means that, for a homogeneous thermal input, no structural distortion results, only a predictable dimensional increase. Because of the symmetry, and if all components have the same thermal expansivity and the same thermal response, the relative positions of two points immediately adjacent to one another, but not directly coupled, (for example, a tool and a workpiece) will not alter with changing temperature. A tetrahedral mounting device is therefore automatically thermally compensated. (This is strictly true only if the workpiece is of the same material as the machine or if the specimen is positioned with respect to the mounting device at the workpiece working face; however, in practice, even in the former case, the departure from complete compensation can be very small).

Components such as rotary motions, linear motions, workpieces, tools, can be added to the tetrahedron usually without significantly compromising its major attributes; some can even be beneficial. An example is the addition of a bracket which is inside the working volume, symmetrical about the machine axis, parallel to the machine base and fixed symmetrically (at the centres) to the three "upright" members. This "bridge" will show no tendency to joint rotation, etc. because the three uprights forming part of the "bridge" cannot shear. The fixing of this bracket/bridge to the centres of the three uprights reduces the effective length, and increases the fundamental frequency of the uprights thus making them statically and dynamically stiffer.

Similarly a bracket/bridge mounted symmetrically across the base will stiffen it in one plane at least—this stiffening can be enhanced in other planes by extra joining of member's centres—all without encroaching upon the machine working volume. Thus the tetrahedron's major attributes are not compromised by the addition of axially symmetrical accessories. The self-contained tension/compression adjusting feature of the structural members can be used to balance up the effect of the accessories masses on structural fundamental frequencies, etc.

A specific embodiment of the invention will now be particularly described by way of example with reference to the accompanying drawings in which:

FIG. 1 is a partially cut-away plan view of a tetrahedral mounting device for a machine tool;

FIG. 2 is a front elevational view of this device in the direction indicated by the arrow A on FIG. 1;

FIG. 3 is a side elevational view in the direction indicated by the arrow B on FIG. 1;

FIG. 4 is a sectional view along the line CC; and

FIG. 5 is a detailed section of a mounting arrangement.

Referring now to the drawings, a tetrahedral mounting structure includes six rod-like members $1a$–$1f$. Each member comprises a tubular outer strut $2a$ enclosing a tensile rod $3a$. At each apex of the tetrahedral structure is a hollow sphere $4a$–$4d$. Each sphere comprises a pair of mating hemispheres $5a$, $5d$, $6a$, $6d$. The halves of the hemispheres are held together by threaded bolts 7. Each sphere abuts the other strut of three of the rod-like members and is clamped thereto by means of bolts 8 attached to the ends of the corresponding enclosed tensile rod. Mounted on the rod-like members remote from the base is a machine tool holder 9. The machine tool holder is clamped to rod-like members by means of threaded bolts 10 and space blocks 11. The mounting is non-kinematic thereby imparting greater rigidity. The machine tool holder has a hole 12 coaxial with the machine principal axis 13 through which passes a drive shaft 14 carrying an air bearing rotary spindle 15 and a grinding tool 16. Mounted on the base rod-like members is a vee slideway 17 bearing a workpiece holder 18 to impart linear motion to a workpiece 19 beneath the grinding tool 16. The slideway has a hollowed-out portion 20 so that the wall thickness is similar to that of the other structural components. The hollow sphere remote from the base contains a bore 21 through which the drive shaft passes.

The ends of the tensile rods do not abut the apical spheres. This is to permit the resonance of the rods to be tuned by adjusting the screws 8 so that it differs from the resonant frequency of the tubular struts 2a–2f.

The interface between the tensile rods and the tubular outer struts may comprise a viscous fluid for Coulomb friction damping.

Preferably all components are made from material with the same expansivity and similar cross-section to equalise thermal response rates.

The rod-like members are preferably all of substantially identical dimensions as are the remaining three. The rod-like members of the two groups are not necessarily of the same dimensions. In such a case an isosceles rather than an equilateral structure will result.

Preferably machining or other activity is performed in the vicinity of the principal machine axis to minimise distortion effects.

Other forms of slideway may be employed. Preferably the linear motion slideway and specimen carrier are connected to drive means at the centre of friction of the slideway.

It is not essential to employ mounting spheres at the apices of the tetrahedral structure. A solid "hinge" comprising a weld contact or pin joint just sufficient to give static stiffness may be used instead.

Additional stiffness may be applied to the base rod-like members by an extra tube screwed or stuck on to the underside.

Advantageously, vibration damping may be introduced at mounting decoupling points.

The use of mounting devices is not limited to machine tools. It may be used in any application, such as surface metrology where a high degree of stiffness and rigidity is required.

Furthermore, a small degree of frustration of the tetrahedral structure is contemplated in some applications, for example, to facilitate apical mounting of subsidiary structures.

We claim:

1. A mounting device comprising six rod-like members the ends of which are rigidly coupled together to form a substantially tetrahedral structure and mounting means comprising a rigid member fixedly coupled to three of said rod-like members, said three rod-like members not being co-planar.

2. A mounting device according to claim 1 wherein said rod-like members are arranged in two groups of three the members of each group being of substantially equal dimensions to one another.

3. A mounting device according to claim 2 wherein all said rod-like members are of substantially equal dimensions to one another.

4. A mounting device according to claim 1 wherein said rod-like members are coupled by means of substantially spherical hollow members.

5. A mounting device according to claim 4 wherein each hollow member comprises a pair of mating hemispheres.

6. A mounting device according to claim 1 wherein said rod-like members are coupled together by means of welded contact.

7. A mounting device according to claim 1 wherein said rod-like members are coupled together by means of a pin joint.

8. A mounting device according to claim 1 wherein decoupling means is provided between said rod-like members to inhibit the transmission of vibrations.

9. A mounting device according to claim 1 wherein susceptibility to vibration is decreased by maximising the fundamental frequencies of the components of the device by using low aspect ratio components.

10. A mounting device according to claim 1 wherein said rod-like members are of two-part construction comprising a strut member and a tensile member.

11. A mounting device according to claim 10 wherein said rod-like member includes a tubular member having a tensile rod therethrough.

12. A mounting device according to claim 10 wherein at least two of said rod-like members have a different fundamental frequency of vibration.

13. A mounting device according to claim 12 wherein at least one of said tensile rods is provided with an adjusting screw system to tune the corresponding tubular members' fundamental frequency of vibration.

14. A mounting device according to claim 12 wherein at least one of said tubular members is provided with viscous damping material between the tubular member and the tensile rod.

15. A mounting device according to claim 1 wherein the mounting means is non-kinematically coupled to said three rod-like members.

16. A mounting device according to claim 1 having additional stiffening means attached to the rod-like members.

17. A machine tool incorporating a mounting device according to claim 1.

18. A measuring instrument incorporating a mounting device according to claim 1.

* * * * *